US006487684B1

(12) United States Patent
Ishii

(10) Patent No.: US 6,487,684 B1
(45) Date of Patent: Nov. 26, 2002

(54) MESSAGE DISPLAY DEVICE

(75) Inventor: Hirotomo Ishii, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/345,077

(22) Filed: Jun. 30, 1999

(30) Foreign Application Priority Data

Jul. 1, 1998 (JP) .......................................... 10-186207

(51) Int. Cl.[7] .................................................. G06F 3/14
(52) U.S. Cl. .............................. 714/44; 714/46; 714/57
(58) Field of Search ............................ 713/600; 710/1; 707/526; 714/40, 44, 46, 57

(56) References Cited

U.S. PATENT DOCUMENTS 5,027,154 A * 6/1991 Ujiie et al. ................... 355/77
5,937,151 A * 8/1999 Kadota ...................... 358/1.15

FOREIGN PATENT DOCUMENTS

| | | |
|---|---|---|
| JP | 05-011954 | 1/1993 |
| JP | 07-311501 | 11/1995 |

* cited by examiner

*Primary Examiner*—Thomas M Heckler
(74) *Attorney, Agent, or Firm*—Morrison & Foerster LLP

(57) ABSTRACT

When the user performs input seeking a message that pertains to the status of the device, the message display device of the present invention selects and displays based on the data generated by a data generator comprising a counter and/or a sensor an appropriate message from a group of messages, each of which corresponds to various input contents.

18 Claims, 3 Drawing Sheets

MESSAGE DISPLAY DEVICE

RELATED APPLICATION

This application is based on application No.Hei10-186207 filed in Japan, the entire content of which is hereby incorporated by reference.

BACKGROUND OF THE INVENTION

1. Field of the Invention

The present invention pertains to a message display device, and more particularly, to a message display device in which the status of various devices, such as a printer, may be reflected in the contents of the display.

2. Description of the Related Art

In a local area network, peripheral devices such as personal computers and printers are connected to one another through a network. The printer performs printing based on print jobs that it receives from personal computers via the network. Such personal computers often have a function to display on the monitor necessary information when a user is having trouble with the operation (hereinafter 'the help function'). For example, where a problem has occurred with the printer, the user can learn how to eliminate the problem through a dialogue with the display screen using the help function.

However, the contents of the display provided through the help function have conventionally been pre-fixed, and do not reflect the status of the printer, i.e., the number of uses, for example. Therefore, the problem arises that since a number of possible causes of the problem with the device are displayed at the same time, the user cannot easily know which one to select.

SUMMARY OF THE INVENTION

The object of the present invention is to resolve the problem described above. More specifically, the object of the present invention is to provide a device that can select a message based on data. Another object of the present invention is to provide a device or a method that can perform message display that assists the user in solving the problem. A third object of the present invention is to provide a device or a method by which the status of the device may be reflected in the help message display. A fourth object of the present invention is to provide a device or a method that can display a help message in accordance with the information input by the user.

These and other objects are attained by means of a message display device comprising:

an input unit that receives input from the user;

a data generator that generates data;

a memory that stores multiple messages;

a display unit that displays the messages stored in the memory;

a selecting means that selects a message from among the multiple messages stored in the memory based on the input received by the input unit and the data generated by the data generator; and a controller that causes the selected message to be displayed on the display unit.

The objects described above are also attained by means of a message display device described above, wherein the data generator generates data regarding the status of the printer.

The objects described above are also attained by means of the message display device described above, wherein said message display device has multiple data generator elements and, based on the data generated by the first data generator element, the selecting means determines whether or not to refer to the data generated by data generator elements other than the first data generator.

The objects described above are also attained by means of the message display device described above, wherein the data generator comprises at minimum a counter that counts the number of prints made and a sensor that detects the remaining amount of the toner in the printer.

The objects described above are also attained by means of the message display device described above, wherein the messages stored in the memory are help messages.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENT

The embodiments of the display control device and the display control method pertaining to the present invention are explained in detail below.

Figure 1:
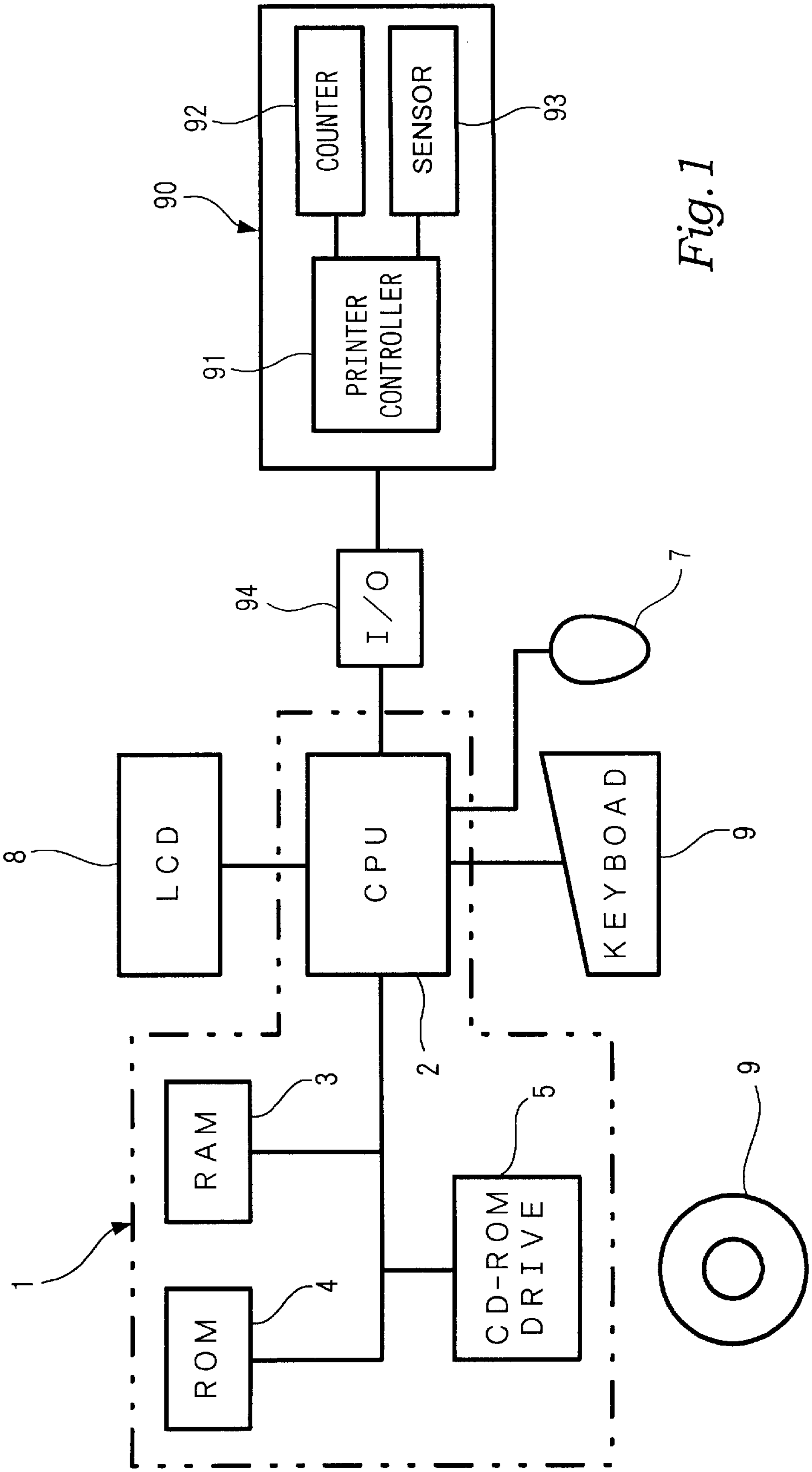
FIG. 1 is a block diagram of a printer system comprising one embodiment of the present invention.

FIG. 1 is a block diagram of a message display device comprising a first embodiment of the present invention.

This message display device has a CPU (central processing unit) 2, which is mounted in the personal computer 1 and operates as a processing means, a RAM (random access memory) 3 that temporarily stores the data that the CPU 2 uses for processing, a ROM (read only memory) 4, an HD (hard disk) 10 that stores the control program for the CPU 2, and a CD (compact disk)-ROM drive 5. The CD-ROM drive 5 is used to read the memory contents of the CD-ROM 9. A utility program to execute the processing sequence described below (the help function) and multiple messages that correspond to the expected input contents are recorded in the CD-ROM 9, which comprises a recording medium.

To the personal computer 1 are connected a keyboard 6 and a mouse 7, which together comprise the input unit, and an LCD (liquid crystal display) 8, which comprises the display unit. The user can input commands and data to the personal computer 1 using the keyboard 6 and/or the mouse 7. The LCD 8 displays the information received from the CPU 2 on the display screen as images.

A printer 90, one of the peripheral devices, is connected to the CPU 2 of the personal computer 1 via an input/output interface (I/O) 94. This printer 90 has a printer controller 91 that controls the operation of the entire printer 90, and a counter 92 and a toner sensor 93, which together operate as the data generator. The counter 92 calculates the cumulative number of prints made by the printer 90. A toner depletion print number, which is equivalent to the number of prints that depletes the toner, is set in this counter 92. It outputs a signal that indicates whether the cumulative number of prints at any moment is more or less than the toner depletion print number. The toner sensor 93 detects the amount of toner inside the toner tank not shown in the drawings. When the toner inside the toner tank is empty, the sensor outputs a 'toner empty' signal indicating the tank is depleted of toner.

When the user orders a job by inputting the 'print' command to the CPU 2 using the mouse 7, for example, the CPU 2 outputs a print job to the printer 90 via the input/output interface 94. When the printer controller 91 receives a print job from the CPU 2, the printer 90 starts printing. The prints obtained as a result of the printing are ejected onto the tray not shown in the drawings.

Figure 2:
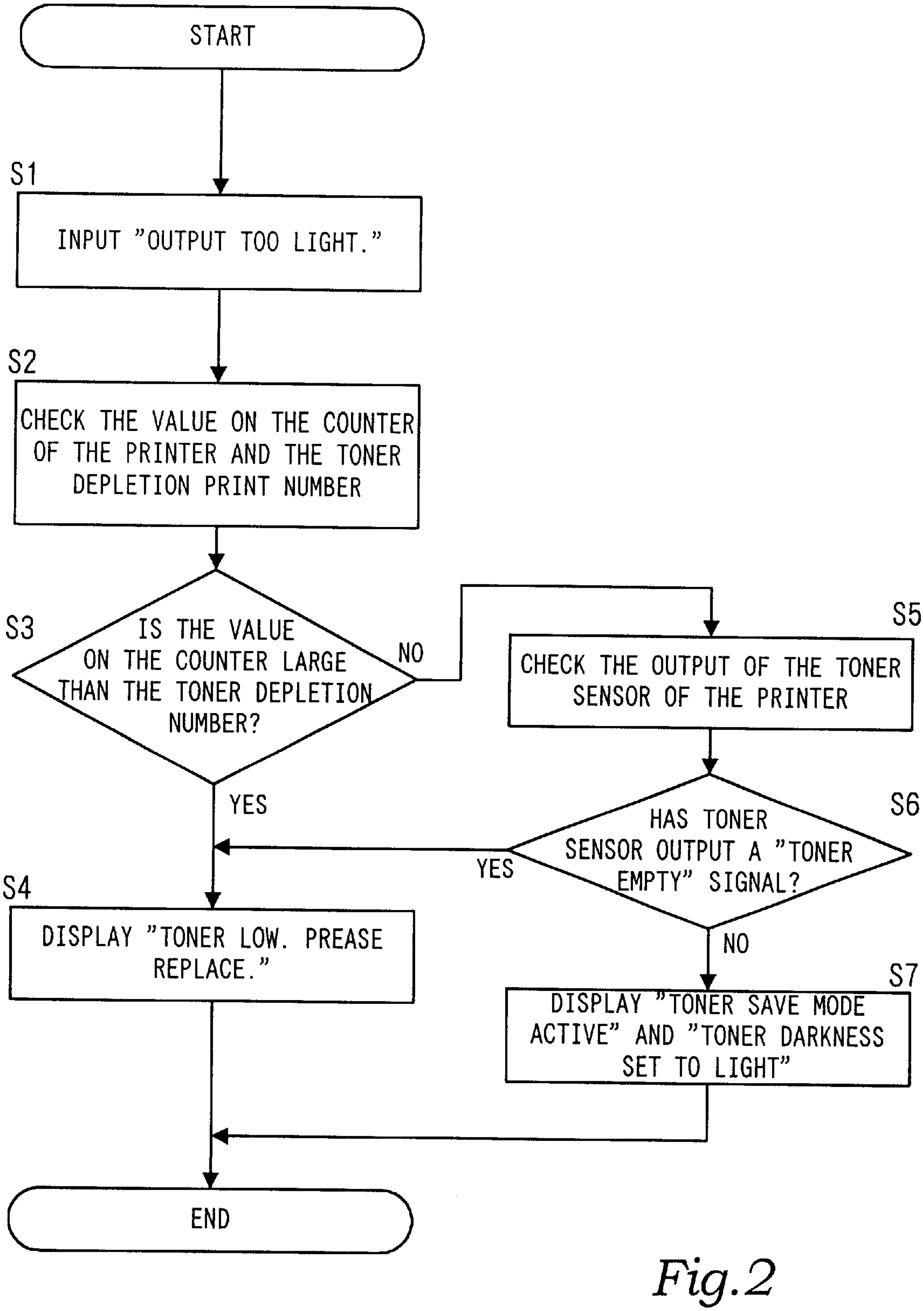
FIG. 2 is a flow chart showing one example of the processing sequence for the help display function pertaining to the present invention.

If the user perceives some type of abnormality, such as insufficient image darkness in the obtained print, and wants to know how to eliminate the problem, the user can insert the CD-ROM 9 in the CD-ROM drive 5 and then open a window by selecting the help function by means of the keyboard 6 or the mouse 7 so that the processing sequence shown in FIG. 2, for example, may be executed in this display control device.

(1) The user first inputs the message 'Output Too Light' requesting a method to deal with the problem (S1). This message is stored in the CD-ROM 9 in advance. The user inputs it by means of the input unit, selecting the desired message from among the messages stored in the CD-ROM 9. The user inputs the message by selecting said pre-stored message by means of the mouse or by directly typing it using the keyboard.

(2) The CPU 2 then checks the value on the counter 92 of the printer 90 and the toner depletion print number (S2).

(3) The CPU 2 determines whether or not the value on the counter 92 is larger than the toner depletion print number (S3). If the value on the counter 92 is larger than the toner depletion print number, it is time to replace the toner. The CPU 2 therefore selects the message 'Toner low. Please replace.' from among the multiple messages stored in the CD-ROM 9. It then causes the message 'Toner low. Please replace.' to be displayed on the LCD 8 (S4).

(4) On the other hand, if the value on the counter 92 is smaller than the toner depletion print number, the CPU 2 checks the output of the toner sensor 93 of the printer 90 (S5) and determines whether or not the toner sensor 93 has output a 'toner empty' signal (S6). If the toner sensor 93 has output a 'toner empty' signal, the toner has been completely consumed for some reason before the toner depletion print number has been reached. The CPU 2 therefore selects the message 'Toner low. Please replace.' from among the multiple messages stored in the CD-ROM 9. It then causes the message 'Toner low. Please replace.' to be displayed on the LCD 8 (S4).

(5) Conversely, if the toner sensor 93 has not detected that the toner in the toner tank has been depleted and has not output a 'toner empty' signal, it is likely that the active mode in the printer 90 is inappropriate. The CPU 2 therefore checks the present mode of the printer 90, and where the Toner Save Mode is active, it selects the message 'Toner Save Mode Active' from among the multiple messages stored in the CD-ROM 9, and where the toner darkness is set to be 'light', it selects the message 'Toner Darkness Set to 'Light''. It then causes either the message 'Toner Save Mode Active' or the message 'Toner Darkness Set to 'Light'' to be displayed on the LCD 8, depending on the message selected (S7).

In addition to the input message 'Output Too Light' regarding the printer, various other messages corresponding to various types of input are stored in the CD-ROM 9. For example, messages that correspond to such input contents as 'Background Fog' or 'Abnormal Machine Sounds' are also stored in the CD-ROM 9. The CPU 2, which comprises the selecting means, checks the counter and/or sensor data, which ever is appropriate, and selects the proper message.

As described above, this message display device can display on the LCD 8 from among the multiple messages stored in the CD-ROM 9 only the proper message in accordance with the contents of the input made by the user and the status of the printer. Therefore, the user can easily deal with the problem in the printer 90 based on the appropriate message.

It is also acceptable if, after reference to the data from the data generator, more than one applicable message is displayed from among the multiple messages stored in the CD-ROM 9. For example, in step S7 described above, the messages 'Toner Save Mode Active' and 'Toner Darkness Set to 'Light'' may be selected and displayed without referring to the present printer mode.

This message display device may only have either the counter 92 or the toner sensor 93. For example, if it is a device having only the counter 92, in the example described above, where 'Output Too Light' is input, the value on the counter 92 and the toner depletion print number are referred to and if the value on the counter 92 is larger than the toner depletion print number, the message 'Toner low. Please replace.' is displayed. On the other hand, where the value on the counter 92 is smaller than the toner depletion print number, the messages 'Toner Save Mode Active' and 'Toner Darkness Set to 'Light'' are displayed.

It is also acceptable if multiple threshold values that indicate the toner depletion print number are set in the counter 92 so that a different message is selected each time the counter passes one threshold value. The counter 92 is reset when the toner is replaced and begins counting the number of prints once more from the time of toner replacement.

In the embodiment described above, the data generator comprises the counter 92 and the toner sensor 93, but the implementation of the present invention is not limited to this. The output of a different counter and/or a different sensor may be reflected in the message selection.

In addition, the device connected to the personal computer 1 is not limited to the printer 90, and the status of other devices may be reflected in the message selection.

In the explanation provided above, a help display system in which the processing shown in FIG. 2 takes place with reference to the information stored in the CD-ROM 9 was explained, but it is also acceptable if the information stored in the CD-ROM 9 is installed in the HD 10 so that the processing may take place referring to the program and message data stored in the HD 10.

Figure 3:
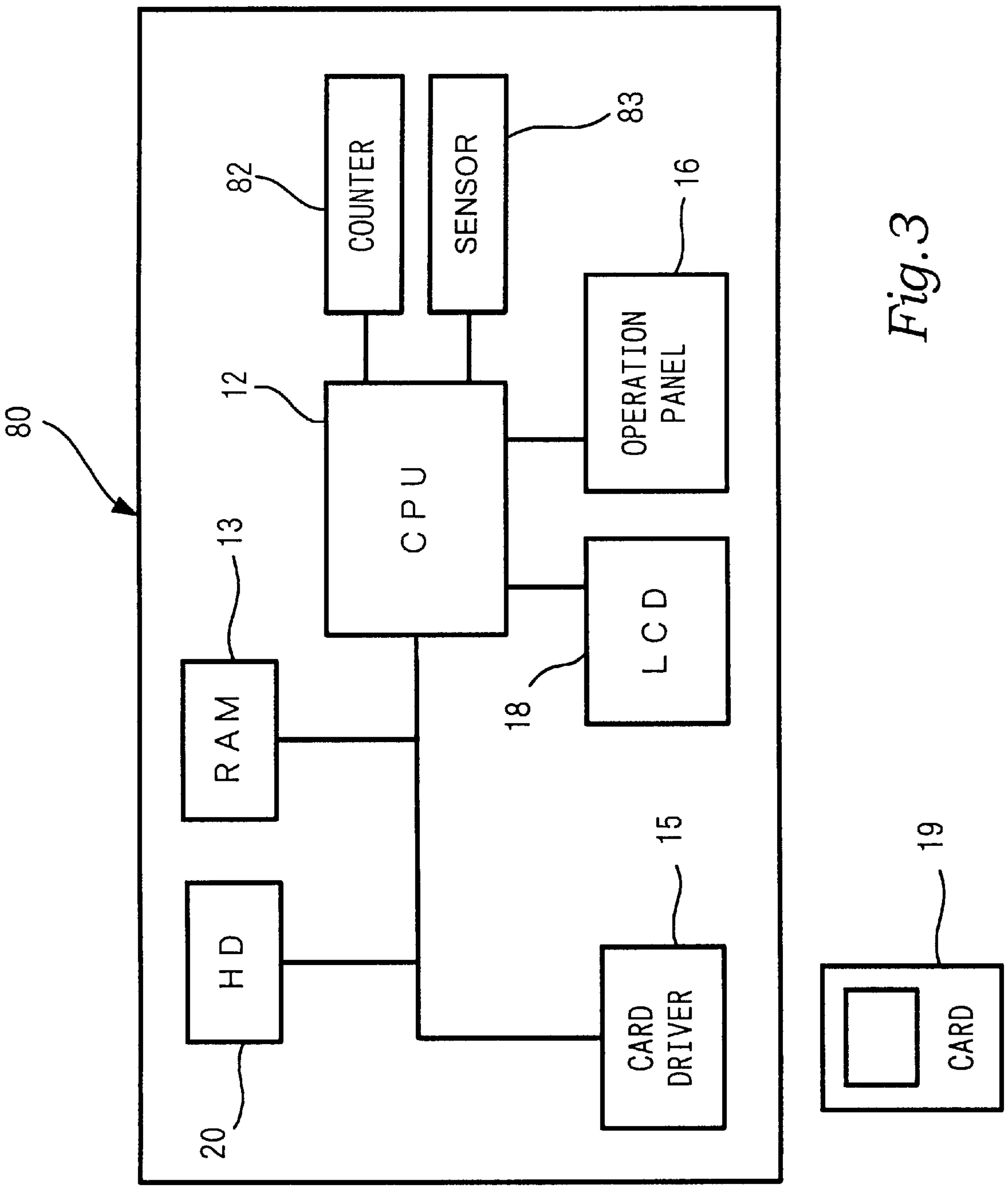
FIG. 3 is a block diagram of a printer comprising another embodiment of the present invention.

FIG. 3 is a block diagram of a message display printer comprising a second embodiment of the present invention.

The printer 80 has a CPU 12 that operates as an information processing means and performs information processing to control the operation of the entire printer, including the help display, a RAM 13 that temporarily stores the data used by the CPU 12 for the processing, an HD 20 that stores the control program for the CPU 12, a card driver 15 that reads the information recorded in a card 19, an operation panel 16 by which the user performs input, and an LCD 18 that operates as a display unit. The printer 80 also has a counter 82 that counts the cumulative number of prints made and a toner sensor 83 that detects when the toner in the toner tank is depleted, as in the first embodiment.

The CPU 12 operates in the same manner as the CPU 2 and the printer controller 91 of the first embodiment, the operation panel operates in the same manner as the keyboard 9 or the mouse 7, and the card 19 and the card driver 15 operate in the same manner as the CD-ROM 9 and the CD-ROM drive 5, respectively. Recorded in the card 19, which comprises a recording medium, are a utility program to execute the processing sequence (the help function) explained above as well as the multiple messages that correspond to expected input contents.

When it is connected to a public-domain personal computer via the I/O port not shown in the drawings, the printer 80 performs printing after receiving printing signals and image data from the personal computer.

Therefore, the processing sequence explained above with reference to FIG. 2 may be executed in the printer 80 shown in FIG. 3 as well.

The first and second embodiments are identical as far as the operation of the CPU 2 and the CPU 12 is concerned. The CPU 2 and the CPU 12 receive the input signals generated through the user's operation of the input unit, checks the data generated in response to the input by means of the data referring unit, selects via the selecting means a specific message based on the input and data, and generates a display instruction signal for the display unit. Therefore, the present invention may be applied in any device and system equipped with a CPU that operates in this manner.

Although the present invention has been fully described by way of examples with reference to the accompanying drawings, it is to be noted that various changes and modifications will be apparent to those skilled in the art. Therefore, unless such changes and modifications depart from the scope of the present invention, they should be constructed as being included therein.

What is claimed is:

1. A message display device comprising:

a receiving unit that receives a user input;

a first signal generator that generates a first signal;

a memory that stores a plurality of messages;

a display unit that displays the plurality of messages stored in the memory;

selecting means that selects at least one message from among the plurality of messages stored in the memory based on the user input received by the receiving unit and the first signal generated by the first signal generator; and a controller that causes the message selected by the selecting means to be displayed on the display unit.

2. A message display device as claimed in claim 1, further comprising:

a second signal generator that generates a second signal;

wherein the selecting means selects at least one message based on the second signal generated by the second signal generator.

3. A message display device as claimed in claim 2, wherein the generated signal relates to a status of a printer.

4. A message display device as claimed in claim 3, wherein the first signal generator has a counter that counts a number of prints made and the second signal generator has a sensor that detects a remaining amount of toner in the printer.

5. A message display device as claimed in claim 4, wherein the first signal is a signal regarding whether a value on the counter is larger than a toner depletion print number.

6. A message display device as claimed in claim 4, wherein the second signal is a signal regarding whether a remaining amount of toner in the printer is an empty condition.

7. A message display device as claimed in claim 1, wherein at least one of the plurality of messages stored in the memory is a help message for a printer.

8. A message display device as claimed in claim 7, wherein the receiving unit receives input for requesting the help message.

9. A message display device as claimed in claim 1, wherein the first signal is a signal regarding a status of a printer.

10. A message display device as claimed in claim 9, wherein the first signal generator has a counter that counts a number of prints made.

11. A message display device as claimed in claim 10, further comprising:

a second signal generator that has a sensor that detects a remaining amount of toner in the printer.

12. A system comprising:

a printer that has a sensor sensing a status of the printer; and a personal computer that communicates with the printer, the printer having:

a memory that stores a plurality of help messages;

first receiving means that receives a question from a user;

first selecting means that selects messages in response to the question received by the receiving means;

second receiving means that receives a signal based on the sensor;

second selecting means that selects at least one message from a plurality of messages selected by the first selecting means in response to the signal received by the second receiving means; and a display that displays the at least one message selected by the second selecting means.

13. A message selecting device comprising:

an input unit that receives input from a user;

a referring unit that refers to a signal;

selecting means that selects at least one message from among a plurality of messages stored in a memory based on the input and the signal; and display instruction means that causes the at least one message selected by the selecting means to be displayed on a display.

14. A message display system comprising:

a memory that stores a plurality of messages;

a display that displays messages;

a machine that outputs a job based on a job instruction;

a signal generator that generates a signal regarding a status of the machine;

a receiving device that receives a request of status of the machine;

selecting means that selects at least one message from among a plurality of messages stored in the memory based on the request of status received by the receiving device and the signal generated by the signal generator; and a controller that causes the at least one message selected by the selecting means to be displayed on the display.

15. A message display system as claimed in claim 14, wherein the display, the signal generator, the receiving device, the selecting means and the controller are in a personal computer.

16. A message display system as claimed in claim 15, wherein the machine is a printer.

17. A message display method comprising the steps of:

receiving an input from a user;

referring to a signal;

selecting at least one message from among a plurality of messages stored in a memory based on the input and the referred signal; and causing the at least one message selected to be displayed on a display.

18. A computer-readable medium having stored thereon a plurality of sequences of instructions, the plurality of sequences of instructions including sequences of instructions, which, when executed by a processor, cause the processor to implement a process for:

receiving an input from a user;

referring to a signal;

selecting at least one message from among a plurality of messages stored in a memory based on the input and the referred signal; and causing the at least one message selected to be displayed on a display.

* * * * *

UNITED STATES PATENT AND TRADEMARK OFFICE

CERTIFICATE OF CORRECTION

PATENT NO. : 6,487,684 B1
DATED : November 26, 2002
INVENTOR(S) : Hirotomo Ishii It is certified that error appears in the above-identified patent and that said Letters Patent is hereby corrected as shown below:

Column 6,
Line 7, after “printer is” please insert -- in --.
Line 49, after “causes” please delete “the”.

Signed and Sealed this

Seventeenth Day of June, 2003

JAMES E. ROGAN
*Director of the United States Patent and Trademark Office*